C. C. CANFIELD.
WALL BOX FOR ELECTRICAL APPARATUS.
APPLICATION FILED APR. 6, 1915.
1,265,744.
Patented May 14, 1918.
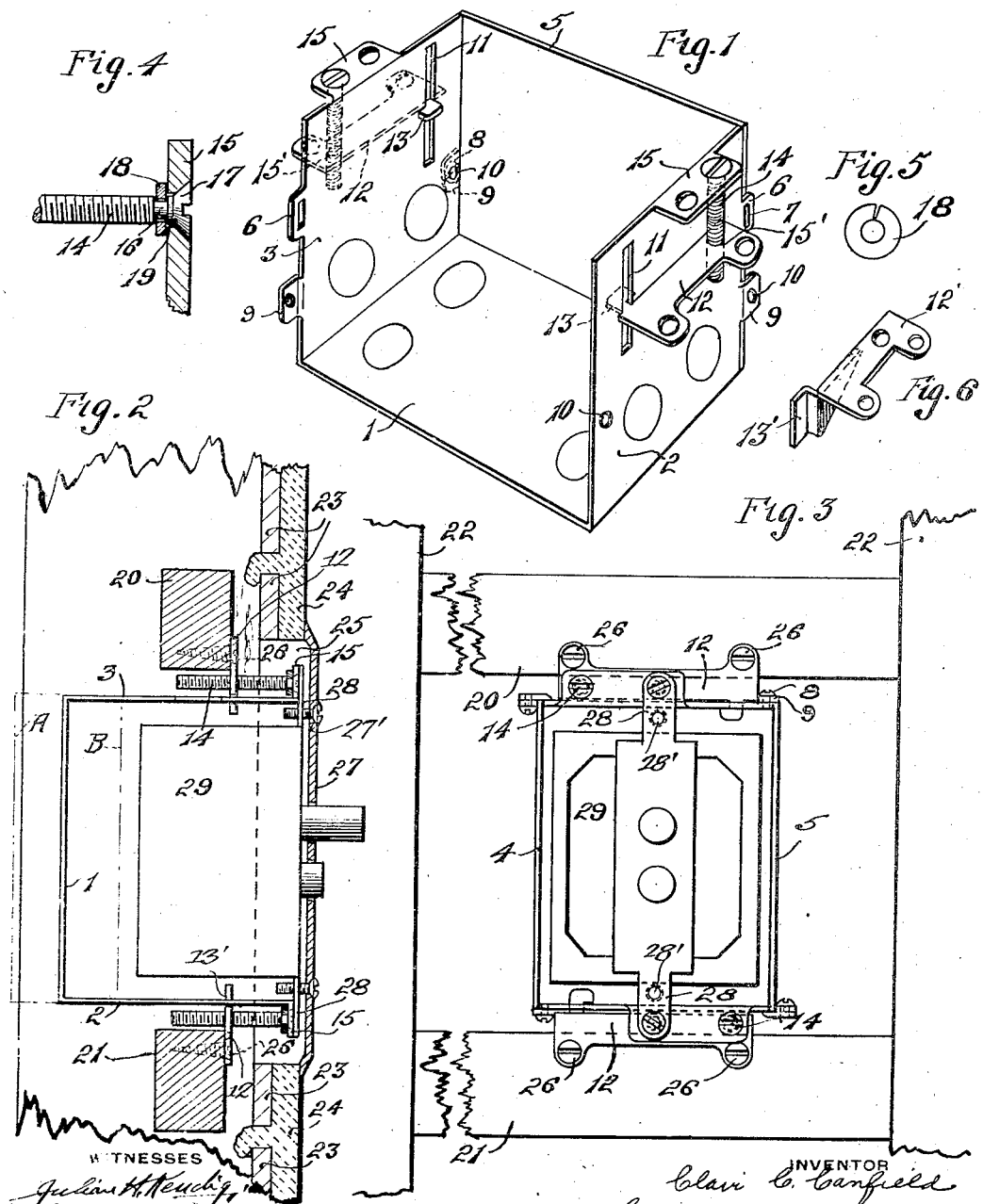

UNITED STATES PATENT OFFICE.

CLAIR C. CANFIELD, OF CRAFTON, PENNSYLVANIA, ASSIGNOR OF ONE-FOURTH TO ALEXANDER P. LINDSAY, OF PITTSBURGH, PENNSYLVANIA.

WALL-BOX FOR ELECTRICAL APPARATUS.

1,265,744.

Specification of Letters Patent.  Patented May 14, 1918.

Application filed April 6, 1915. Serial No. 19,534.

*To all whom it may concern:*

Be it known that I, CLAIR C. CANFIELD, a citizen of the United States, residing at Crafton, in the county of Allegheny and State of Pennsylvania, have invented certain new and useful Improvements in Wall-Boxes for Electrical Apparatus, of which the following is a specification.

This invention relates to wall boxes and more particularly to wall boxes used for housing electrical apparatus such as switches, plug receptacles, etc., and has for its primary objects the provision of a wall box of simple and inexpensive construction which may be adjusted with respect to the wall; the provision of a wall box which may be easily assembled and lined flush with the wall; the provision of a wall box that can be used separately or "ganged" where a plurality of boxes are to be placed in a row, and such other objects as will hereinafter appear, one embodiment of the invention being shown in the accompanying drawings, wherein—

Figure 1 is a perspective view of a wall box with one of the detachable sides removed; Fig. 2 is a longitudinal section through a portion of the wall to which the box is applied, showing the wall box with one side removed and the cover plate in section; Fig. 3 is a face view of the wall box as applied to a wall as shown in Fig. 2, with the cover plate removed; Fig. 4 is a section through a flange of the wall box showing the application of the adjustment screw; Fig. 5 is a plan view of a split washer shown in Fig. 4, and Fig. 6 is a modified form of support or ear for securing the box to the wall.

Referring to Fig. 1, the box comprises a metal sheet, which is bent up at each end to form the ends 2 and 3 of the box. When the box is intended to be used singly, it is provided with sides 4 and 5, Figs. 1 and 3, the side 4 being removed in Fig. 1. Each end portion 2 and 3 is provided with a slotted ear 6, which engages a tongue 7 on the end of the side member. The other end of the side member is retained by means of a screw 8 which extends through a bent ear 9 carried by the side member into a threaded hole 10 in the end members. A number of boxes may be "ganged" in a row as each box carries parts which interlock to hold them together.

The ends of the box are provided with vertical slots 11 which serve as a guide for one end of the adjustable supports 12, a tongue 13 integral with each support projecting through the slot in such manner that it engages the end member when in operative position so that the support cannot be detached from the end member. To assemble the support 12 with the box, the support is held in a vertical position with respect to the box and the tongue 13 slipped through the slot 11. The support is then moved to horizontal position when the extended portion of the tongue 13 will prevent outward movement of the support. The support, however, may be moved from one end of the slot to the other, the slot permitting of a considerable range of adjustment of the support. The other end of the support is carried by means of a screw 14 which is swiveled in an outwardly extending flange 15 which is integral with the top of the box end. The screw 14 projects through a threaded hole 15' in the support 12 and the box is adapted to be moved by the turning of the screw 15 into various positions.

Referring to Fig. 4 it will be seen that the screw 14 has a reduced portion 16 adjacent the head 17, this reduced portion being surrounded by a split washer 18 (Figs. 4 and 5). In assembling the screw with the flange 15 the screw is first inserted through the counter-sunk hole 19 until the head 17 engages the tapered portion of the hole. The split washer 18 is then pinched about the reduced portion 17 of the screw so that the screw is prevented from being withdrawn from the hole.

Referring to Figs. 2 and 3 the manner in which the box is mounted in the wall is shown. A frame for supporting the box consists of two pieces of wood 20 and 21, which are placed horizontally between the usual vertical studs 22 which form a part of the ordinary wall structures. The frame members 20 and 21 are usually placed in position and the box attached thereto before the lathing and plastering are done, it being customary for the plasterer to apply plaster surrounding the box. The lath 23 is usually nailed to the studs 22 and serves to carry the plaster 24, the hole for the switch box being designated in Fig. 2 at 25.

When it is desired to attach the box to the wall the box is placed so that the supports 12 engage the wooden support members 20 and 21. The supports 12 are securely fastened to the supports 20 and 21 by means of screws 26 which extend through suitable holes in the supports 12 into the frame members 20 and 21. As the supports 12 carry the box by means of the slot and tongue engagement previously referred to and the screw 14, it will be seen that the box may be moved inwardly or outwardly by turning the screw 14 in the desired direction, the object of the adjustment being to cause the front face of the box to be positioned substantially flush with the outside face of the plaster.

It quite frequently happens that when the wood supports 20 and 21 are placed in position between the studs 22 they are not accurately positioned, one piece being either in or out from the front face of the studs a greater distance than the other, or they may be placed farther back than is the usual practice causing the ordinary box to be either tilted or set back too far from the wall, this resulting in considerable difficulty when it is attempted to place the box in its proper position. By constructing the box so that its relative position with respect to the supports 12 may be varied, it is easy to adjust the box so that it is flush with the outer face of the wall regardless of the position of the wooden supports 20 and 21. It will be seen that the heads of the adjustment screws 14 are in the front face of the structure and are easily accessible, there being nothing to hinder the adjustment of the box after the supports 12 have been screwed or otherwise fastened to the supports 20 and 21.

It is an absolute necessity to have the box properly positioned and centered so that the cover plate 27 may be properly positioned to cover the hole in the plaster and at the same time be in a position that the screw holes 27' will register with the screw holes 28' in the brackets 28 which carry the switch 29. The brackets 28 are screwed to the flanges 15 and serve to support and center the switch 29 within the box.

As there is liable to be a little lost motion between the tongue 13 and the groove 11 which would permit of a slight rocking motion of the support 21, it is provided that the screw 14, which supports the other end of the support 12, be located adjacent one side of the box at one end thereof and that the screw supporting the other support 12 at the other end of the box be placed at the opposite side of the box. When the supports 12 are screwed to the wooden supports 20 and 21 the box will be rigidly supported because the screws are located as just described.

Referring to Fig. 2 it will be seen that the box may be moved in or out so that the bottom thereof will occupy the position shown in dotted lines A and B, such large range of adjustment permitting of considerable inaccuracy in the placing of the support members 20 and 21, without causing any inconvenience in positioning the box in its proper location.

Referring to Fig. 6, a modified form of support or ear is shown which consists of a piece of sheet metal formed into a supporting ear 12' and provided at one end with a downwardly bent wing 13' having a portion thereof bent so that it will engage the slot 11 in the ends of the box. By thus forming the support 12' with a wing 13' an extending bearing is provided which minimizes any tendency of the support to rock in the slot.

It is obvious that a number of forms of supports may be designed for sliding engagement with the box ends and that other means may be provided for moving the box relative to the supports without departing from the spirit of my invention.

What I claim is:

A receptacle for electrical apparatus comprising a metal box having a bottom and side walls for inclosing an electrical fixture, lugs extending laterally from opposing side walls adjacent the fronts thereof for supporting the electrical fixture within the box, a pair of supporting ears for the box slidably attached thereto beneath the lugs, adapted to be secured to the wall so that the box may be adjusted forwardly or rearwardly with respect to the supporting ears and provided with a threaded hole, and screws mounted for rotation in the lugs but held against longitudinal movement with respect thereto adapted to be screwed into the threaded holes in the supporting ears whereby the box may be adjusted forward or backward with respect to the face of the wall when the screws are turned.

In testimony whereof I have hereunto signed my name in the presence of the two subscribed witnesses.

CLAIR C. CANFIELD.

Witnesses:
  JULIAN H. KENDIG,
  JAS. L. WELDON.